Jan. 4, 1944.   L. M. POTTS   2,338,131
SELECTOR APPARATUS
Original Filed Nov. 7, 1940   2 Sheets-Sheet 1
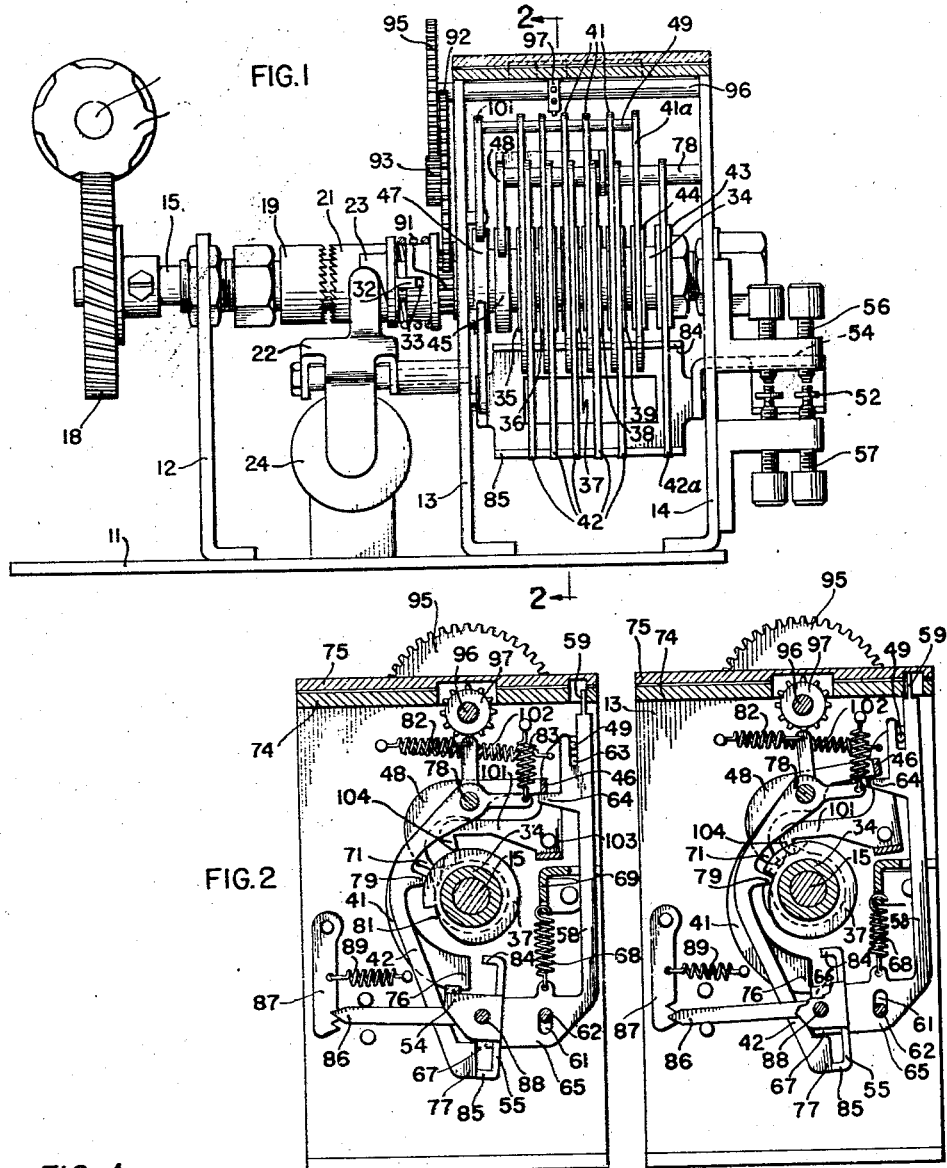
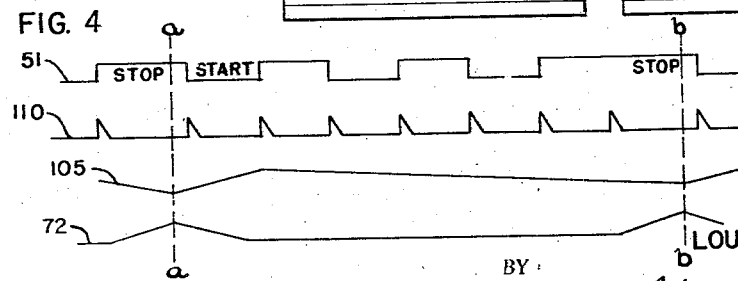
INVENTOR.
LOUIS M. POTTS
BY
ATTORNEY.

Jan. 4, 1944.   L. M. POTTS   2,338,131
SELECTOR APPARATUS
Original Filed Nov. 7, 1940   2 Sheets-Sheet 2
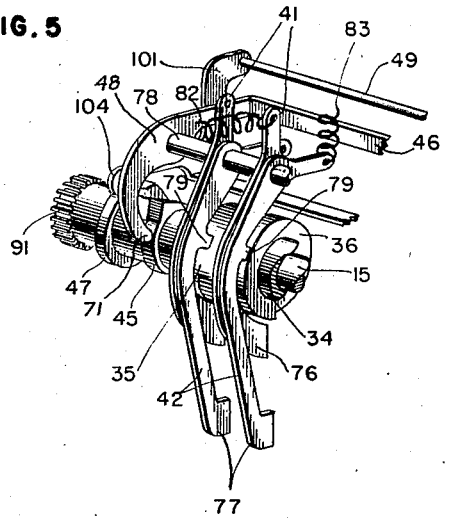

Patented Jan. 4, 1944

2,338,131

UNITED STATES PATENT OFFICE 2,338,131

SELECTOR APPARATUS

Louis M. Potts, Evanston, Ill., assignor to Teletype Corporation, Chicago, Ill., a corporation of Delaware Original application November 7, 1940, Serial No. 364,631. Divided and this application January 6, 1943, Serial No. 471,433

9 Claims. (Cl. 178—17)

This invention relates to automatic telegraph transmitters in which signal impulses are generated under the control of a perforated tape and more particularly to the tape sensing mechanisms thereof.

This application is a division of application Serial No. 364,631, filed November 7, 1940.

The primary object of the invention is to provide a tape sensing means which is positively moved forward with the tape during the sensing operation at a speed equal to the linear advancement of the continuously moving tape.

Another object of the invention is to provide a guiding mechanism for each element of the sensing device to align them collectively with the tape.

These and other objects of the invention are accomplished by mounting tape sensing fingers of the transmitter on supporting members pivoted about a common axis in a manner permitting reciprocal motion to be imparted thereto by a cam driven pin extending through a bifurcated projection in each member so that the fingers carried thereon are first aligned transversely with the tape, positively advanced in timed relation with the tape advancing sprocket wheel, withdrawn from the tape, and returned to the sensing position to complete the cycle.

For a more comprehensive understanding of the present invention, reference may be had to the accompanying drawings and to the detailed specification following hereinafter wherein like reference characters represent corresponding parts throughout and wherein, Fig. 1 is a side elevational view of a perforated-tape controlled transmitter unit having embodied therein certain features of the present invention;

Fig. 2 is a transverse sectional view taken approximately on line 2—2 of Fig. 1 showing the sensing fingers and supporting mechanisms as positioned for the beginning of the sensing operation;

Fig. 3 is a view similar to Fig. 2 showing the sensing fingers and supporting members in their most advanced position;

Fig. 4 is a diagrammatic timing chart illustrating the motion of certain mechanisms in the structural embodiment of Figs. 1, 2, 3, and 6;

Fig. 5 is a detailed perspective view of the cam sleeve showing the sensing finger's advancing mechanisms and related apparatus;

Fig. 6 is a fragmentary end elevation of the power driving train with certain parts of the apparatus broken away and showing the gearing by which the tape advancing sprocket wheel is moved in timed relation with the sensing fingers supporting members' advancing mechanism; and Fig. 7 is a diagrammatic circuit illustration of a tape perforator and transmitter.

Attention is now directed specifically to Figs. 1, 2, 3, 6 and 7 of the accompanying drawings wherein the reference character 11 denotes a base plate of a transmitter apparatus upon whose surface are mounted three supporting frames indicated 12, 13, and 14. A shaft 15 extends longitudinally of the plate 11 and is journaled within an alignment of bearing apertures located in the frames 12, 13, and 14. Rotary motion originating with a prime mover represented by the shaft 16, Fig. 1, is imparted through the driving worm 17 to a driven gear 18 secured to said shaft 15. The direction of rotation is clockwise as viewed in Figs. 2, 3, and 6, and the driving clutch element 19 being an integral part of shaft 15 partakes of this rotation continuously.

A driven clutch element 21, having an end surface radially serrated to cooperate with a corresponding surface on driving clutch element 19 receives, corresponding rotary movement when released from its dormant position as illustrated in Fig. 1 by the withdrawal of interfering armature 22 whose upright extremity is normally spring urged to be interposed in the path of a declutching lug 23 which, by reason of its inclined surface first withdraws driven clutch element 21, then by positive engagement with the upright extremity of armature 22, holds the former member from rotating with the driven element 19.

Armature 22 may be withdrawn from interference with lug 23 upon the energization of tape slack controlled magnet 24, see Fig. 7, in consequence of the release of a slack sensing arm 28 whence clutch element 21 is brought into engagement with element 19.

Magnet 24 which controls armature 22 is energized over a circuit 25 except when this circuit is broken by the separation of contactor 26 from its contact point 27. Contactor 26 is carried by said tape slack lever 28 pivoted at 29 and when the slack in tape loop 31 exceeds a predetermined quantity, arm 28 is permitted to droop to an extent which permits contact blade 26 to engage its contact point 27. Upon the shortening of tape loop 31, however, the lowermost extremity of arm 28 is engaged thereby, causing said arm to be rotated clockwise about pivot 29 until contactor 26 is separated from contact point 27 at which time magnet 24 is de-energized permitting armature 22 to be interposed into the path of clutch disengagement lug 23, as afore-stated.

The end of clutch driven member 21 opposite its serrated face is formed with a tongue 32 receivable within a slot 33 in the flanged extremity of a cam sleeve assembly 34, Fig. 1. Sleeve 34 carries a series of cams including five cams indicated 35 to 39 each of which is operative upon an individual pair of transfer levers 41 and 42, cam 43 which serves to place invariably a transmitting contact into stop position at the conclusion of a signal cycle, cam 44 which serves to invariably place the transmitting contact into spacing position at the start of a signal cycle, cam 45 which during a given period in the cycle through the agency of its transverse bail 46 serves to withdraw a set of feeler levers 58 from the perforated strip, and cam 47 which through bell crank lever 101 moves a feeler lever guide pin 48 steadily forward during the time that any of the set of feeler pins are extending into the strip.

Having thus introduced each of the cams carried upon assembly sleeve 34, more particular reference to the performance of each will be had later during the detailed description of its apparatus. The sequence of operations of the several cams 35 to 39, 45 and 47 is portrayed on the accompanying timing chart, Fig. 4. On this chart a complete cycle is represented by the time interval between line a—a and line b—b. It is to be noted that transmission may continue without interruption so long as slack in the loop 31 prevails, and also that one signal cycle follows another during transmission after the manner of conventional start-stop distributors. In terms of the signal curve 51, Fig. 4, during consecutive signals, line b—b of one signal coincides with the line a—a of the succeeding signal.

Curve 51 of Fig. 4 represents a typical signal in which stop current is of a predetermined marking polarity, start current is of a predetermined polarity different from that of stop current and the five signal intervals designated 1, 2, 3, 4, and 5 may, of course, be constituted of any permutable arrangement of marking and spacing current. The illustration of Fig. 4 contemplates alternate changes during successive signal intervals of the code signal for the sake of facile illustration.

Curve 51 portrays the action of a contactor 52, Fig. 6, which is carried upon a bracket 53 integral through horizontal bar 54 with the selector bail 55.

Contactor 52 may fluctuate between a pair of contact point screws 56 and 57 each associated with an individual current characteristic such as plus, minus or zero current. To accord with standard practice, contact screw 57 will be connected with marking or plus current while contactor 56 will be connected to no-current.

As has been said, the behavior of contactor 52 during the start and stop impulses of each signal, as portrayed for example by curve 51, is invariable but its behavior with respect to the five code combination signal impulses will vary in accordance with the positioning of a set of five tape feeler levers 58. Feeler levers 58, as portrayed in Figs. 2 and 3, are all of identical contour. Each carries at its uppermost extremity a feeler pin 59 of small diameter so as to be easily admitted into the code perforations of a control form, such as a perforated tape. Each feeler lever body has an elongated hole 61 through which passes the anchor pin or shaft 62 which determines the extent and to some degree the direction in which each lever 58 may be moved. Another shaft 49 passing transversely through the several feeler levers as does shaft 62 is also located in an elongated slot designated 63 in the several feeler levers 58. Since elongated slots 61 and 63 are arranged in parallel relationship and in a generally longitudinal direction with respect to the feelers, it will be understood that pin 49 will in no wise restrict the vertical motion of the feeler levers 58 but will restrict said levers against rotation about shaft 62 as a center.

In addition to the afore-described appurtenances each feeler lever is also provided with a sidewardly extending shoulder lug 64 across the top of which there is disposed the transverse restoration bail 46, mentioned above. The lowermost extremity of each feeler lever comprises a plate section indicated 65 directed leftwardly as viewed on Figs. 2 and 3, and each said plate section is provided with right angular abutment shoulders 66 and 67. An individual spring 68 connected between an ear formation in each lever 58 and an anchor bracket 69 urges each one of said levers 58 upwardly but during a brief interval of each cycle all of the feeler levers are restrained against the influence of their several springs 68, that is, when bail 46, a part of a lever 48 is urged downwardly depressing all of the feeler lever lugs 64, as indicated in Fig. 2. One end of lever 48 terminates with a cam follower projection 71 which rides the periphery of afore-described cam 45.

The period during each cycle when the depression in cam 45 becomes effective to permit all of the feeler levers 58 to rise is indicated by the horizontal portion of curve 72, see Fig. 4. The brief interval during which the feeler levers are depressed or withdrawn is represented by the comparatively short peak in said curve 72. When freed by the lifting of bail bar 46 each of the several feeler levers 58 seeks to rise to an upper level such as indicated in Fig. 3. This extent of movement is permitted only when a perforation is encountered in the tape which passes between the guide plates 74 and 75. When the feeler projection 59 encounters no perforation in the tape, however, a particular lever 58 will be permitted to rise only until its upper extremity encounters the surface of the tape in which case it will assume a position approximately such as that illustrated in Fig. 2.

Of the two possible positions which each feeler lever 58 is capable of assuming, the one referred to previously, when projection 59 extends through the tape, is commonly termed marking, while the other, when projection 59 is blocked by the tape, is referred to as spacing. This classification is in conformity with the same terminology as before applied to line signals of current and no-current polarity. When a feeler lever 58 is in its marking position, shoulder 66 of its lowermost extremity will be presented in the position illustrated in Fig. 3, whereat it blocks the cooperating shoulder 76 of the class of transmitting bail transfer levers designated 41, while shoulder 67 of the plate 65 is sufficiently raised so as to clear shoulder 77 of lever 42, as best illustrated in Fig. 3. On the other hand, when said feeler is in the spacing position, shoulder 66 will be below shoulder 76 so as not to interfere with the movement of lever 41 but instead lowermost shoulder 67 of feeler lever 58 will then engage the cooperating shoulder 77 of the associated transfer lever 42. Accordingly, depending upon the position of each feeler lever 58, one or the other of each pair of transfer levers 41—42 will be permitted to rotate counterclockwise about the common pivot 78 to the exclusion of the other one.

While selector transfer levers 41 and 42 are substantially different in contour they resemble each other, nevertheless, throughout a brief intermediate portion and particularly in the proximity of their follower projections 79. In fact, the projections 79 of all levers 41 and 42 are in the same longitudinal alignment and each pair relating to a set of levers 41 and 42 is designed to rest upon the periphery of a particular one of the set of five distributor cams 35 to 39. The contour of the several cams 35 to 39, inclusive, is identical and is as indicated in Figs. 2 and 3. However, the several cams 35 to 39 are successively displaced each from the other by a constant angular progression. Accordingly, the several cams are so arranged that the dwells or low portions 81 in their peripheries occur successively at any particular point as the cam assembly 34 is rotated by the clutch elements, 19—21.

At an assigned interval in the selective cycle, each particular one of the cams 35 to 39 will present its nadir or low portion 81 to its associated pair of transfer levers 41—42. Since for each impulse but one of said two levers 41 and 42 may be free with respect to the interfering shoulders 66 and 67 of its associated feeler lever portion 65, that particular one of said pair of levers 41—42 will be permitted to rotate counterclockwise about pivot 78 under the influence of its individual spring 82 or 83 and as a result will cause to be engaged its corresponding one of the two transfer bail edges 84 or 85. When bail edge 84 is engaged by its lever 41, the bail 55 will be rotated clockwise about pivot 88, causing its latching projection 86 to be moved to the uppermost of the detent notches in detent lever 87. On the other hand, if the lowermost bail edge 85 is engaged by its associated lever 42, bail 55 will be rotated counterclockwise about pivot 88 causing detent projection 86 to register and be engaged in the lowermost of the detent notches of detent pawl 87. The latter member is urged by a spring 89 in counterclockwise direction about its pivot, holding bail member 55 in either of its positions as determined by one or the other of the previously operated levers 41 or 42, in which position said bail 55 will continue until it is operated by a lever 41 or 42 differing in position from said previously operated one of said levers. It is to be understood that the force of either one of the springs 82 or 83 is sufficient to overcome the effect of said detent spring 89 so that upon the operation of one or the other of said levers 41 or 42, the retaining projection 86 may be moved quickly in a corresponding manner.

Since but one of each pair of levers 41 and 42 may be operated to the exclusion of the other and since the depressions in cams 35 to 39 are arranged in a spiral sequence, there is produced during the rotation of cam assembly 34 a set of signaling impulses by the operation of contactor 52 as influenced by the fluctuations of bail 55 which in turn is dependent upon the operation of said set of pairs of levers 41 and 42.

Although in the operation of the instant disclosed apparatus there is contemplated the customary intermittent motion on the part of a set of feeler levers 58 as in the case of conventional tape transmitter mechanism, a novel practice and a means for its execution is proposed herewith in the use of a non-intermittent or continuously moving tape in conjunction with said intermittent feeler levers 58. It will be noted that a driving gear 91, Fig. 6, is formed as a part of the assembly 34. This element meshes with a larger driven gear 92 which together with an integrally associated driving pinion 93 is carried upon an idler shaft 94. Driving pinion 93 meshes with a driven pinion 95 whose shaft 96 extends transversely across the tape sensing apparatus and has fastened to it the sprocket feed 97. So long as the motion of assembly sleeve 34 is sustained and continuous, the motion of shaft 96 is sustained and continuous. Accordingly, since tape feed sprocket 97 is an integral part of shaft 96, the motion of the tape as induced by the teeth of sprocket wheel 97 is correspondingly even and sustained in contradistinction to the conventional intermittent or step-by-step movement.

The sprocket teeth of wheel 97 are adapted to fit into perforations customarily provided in the approximate longitudinal center of a control strip for the purpose of advancing the strip both during preparation and subsequently during its use as a control medium. Since the tape feelers 59 extend into the perforations of the tape during a substantial period of each signal cycle and since the tape is continuously in motion during this period, means have been provided for positively moving the feeler levers 58 in the same direction as that in which the tape is moving and at substantially the same rate of movement so that relative alignment is positively maintained between the feeler lever pins 59 and the code perforations in the tape.

To understand how this is accomplished, reference will again be directed to the feeler lever alignment pin 49 mentioned above. This pin which passes through the slot 63 of the several feeler levers 58 is anchored in a bell crank lever designated 101. The vertical arm of bell crank lever 101 carries the afore-mentioned pin 49 and to it is tied one end of a tension spring 102, the other terminal of which is anchored to the framework of the apparatus. Accordingly, spring 102 urges counterclockwise rotation to bell crank 101, causing it to seek to rotate about its pivot 103. Such rotation may advance only until the follower nose 104 which is formed with the other arm of bell crank 101 engages the periphery of afore-described cam 47, the contour of which is such as to induce a movement on the part of bell crank 101 to correspond with the curve 105 indicated in Fig. 4. From this it will be understood that the motion of the several feeler levers 58 during the five impulse intervals of a code signal is slowly in a direction from right to left, as viewed in Figs. 2 and 3, and that thereafter, during a brief interval corresponding generally to the stop-start, or some part of either interval of each signal cycle, all of said feeler levers 58 having meanwhile been extracted by the operation of bail 46, as portrayed by curve 72 of Fig. 4, they are forthwith returned from a position as indicated approximately in Fig. 3 to one such as indicated approximately in Fig. 2.

In Fig. 1 the reference character 41a denotes a special transfer lever resembling in contour the class of levers 41 of which one is associated with each cam 35 to 39, as afore-described. Correspondingly, the reference character 42a denotes a special transfer lever resembling in contour the general class of levers 42. At an interval during each signal cycle preceding the five impulse intervals of the code combination, cam 44 presents its recess to the projection 79 of lever 41a causing said lever to engage edge 84 of the contact operating bail so that it is rocked clockwise, Figs. 2 and 3. As a result contactor 52 engages point 56 and a spacing or start impulse is invariably produced. Thereafter follow the five code impulses and then cam 43 presents its drop-off to lever 42a causing the latter to rotate the contact bail counterclockwise. This moves contactor 52 into engagement with point 57 causing a marking or stop impulse to be generated. In this way levers 41a and 42a operate invariably to produce the essential phasing (start and stop) impulses of the system.

Having explained the performance of each one of the cams 35 to 39, 43 and 44, inclusive, in connection with their individual functions of determining the operative instants of levers 41, 42, 41a, and 42a, attention is now directed to the curve 110, Fig. 4. Here there is represented by the sharp saw tooth portions of the curve the instants of occurrence of each of said cam drop-offs, and by comparing this curve with the one indicated 51 it will be observed that the length of each signal impulse or component is determined by the distance from one cam drop-off to a succeeding one. Thus, while conventional types of cam operated transmitting apparatus depends for accurate signal reproduction upon the full contour of their controlling cams, the instant apparatus depends solely upon the location of each cam drop-off and not upon the further characteristics of each cam contour.

While the present invention has been explained and described with reference to certain specific embodiments, it is to be understood nevertheless that certain variations and modifications may be made without departure from the sphere or scope thereof. Accordingly, it is not intended to be restricted in any way to the specific illustrations of the accompanying drawings nor to the particulars of the foregoing detailed specification except as indicated in the hereinafter appended claims.

What is claimed is:

1. In an apparatus for sensing continuously moving perforated tape, a set of members supported for reciprocable motion, portions on said members adapted to engage a perforated tape and to protrude through perforations thereof, a guide element for aligning said members transversely, and a cam controlled apparatus for varying the position of said guide element in order to position said members in accordance with the progress of continuously moving tape.

2. In an apparatus for sensing a perforated tape, mechanism for continuously moving said tape, a plurality of elements supported for reciprocable motion to engage and probe said tape, a guide for maintaining the alignment of said elements with respect to said tape, and a cam controlled apparatus for varying the position of said guide in order to advance said elements in accordance with the motion of said continuously moving tape.

3. In a tape sensing and advancing apparatus, a set of probing elements supported for reciprocable motion including appurtenances adapted to engage a perforated tape, a guide for said elements, and a movable apparatus for varying the position of said guide and said elements in order to progress said elements in accordance with continuously moving tape.

4. In a continuously moving tape sensing and advancing mechanism, a plurality of sensing fingers carried on supporting arms having aligned slots in each, a cam driven pin transversely engaging said supporting members by entry in said slots, a tape advancing wheel, a perforated tape, means for urging said sensing fingers against said tape, means for giving forward movement to said sensing fingers in timed relation with said tape advancing wheel whereby said sensing fingers are advanced with the tape at a speed equal to that of the said tape's linear advance.

5. In a transmitter, a tape sensing mechanism comprising a tape advancing sprocket wheel, a tape, a plurality of tape sensing members having tape engaging portions thereon, means for positively advancing said sensing members in timed relationship to the speed of said sprocket wheel, and means for aligning said sensing members transversely of said tape.

6. In a tape sensing device, a tape advancing sprocket wheel, a tape having code perforations therein, tape sensing fingers, means for urging said fingers into engagement with said tape for entry into said perforations, means for bringing said sensing fingers into transverse alignment with said tape, and means for positively advancing said sensing fingers forward with the tape at a speed equal to that of the moving tape.

7. In a transmitter, a tape sensing mechanism comprising a plurality of tape sensing members pivotally supported for reciprocal motion and having bifurcated extensions parallelly aligned with said sensing members, a power source consisting of a driven shaft, means receiving power from said shaft for advancing said tape sensing members, a tape advancing sprocket wheel, means for driving said tape advancing sprocket wheel from said power shaft whereby a tape is advanced and sensed by said sensing members at a uniform speed.

8. A plurality of tape sensing members having vertically aligned slots common to each, a tape channel carrying a tape advancing sprocket wheel therein, a tape, means for urging said tape sensing members into engagement with said tape, means for aligning said tape sensing members, and means for positively advancing said tape sensing members with said tape at a speed equal to the linear advance of said tape.

9. In a tape transmitter under the control of perforated tape, means for sensing a tape in accordance with the perforations carried thereon, means for transversely aligning said sensing means with said tape, and means for positively advancing said sensing means with said tape at a speed equal to that of said tape.

LOUIS M. POTTS.